(12) United States Patent
Zhang et al.

(10) Patent No.: US 12,081,298 B2
(45) Date of Patent: Sep. 3, 2024

(54) METHOD, SYSTEM, COMPUTER DEVICE, AND STORAGE MEDIUM FOR NON-CONTACT DETERMINATION OF A SENSING BOUNDARY

(71) Applicant: Peking University, Beijing (CN)

(72) Inventors: Daqing Zhang, Beijing (CN); Shengjie Li, Beijing (CN)

(73) Assignee: Peking University, Beijing (CN)

( * ) Notice: Subject to any disclaimer, the term of this patent is extended or adjusted under 35 U.S.C. 154(b) by 532 days.

(21) Appl. No.: 17/344,799

(22) Filed: Jun. 10, 2021

(65) Prior Publication Data

US 2021/0391908 A1    Dec. 16, 2021

(30) Foreign Application Priority Data

Jun. 10, 2020  (CN) .......................... 202010521645.5
Jun. 10, 2020  (CN) .......................... 202010521759.X (51) Int. Cl.
| | |
|---|---|
| *H04B 7/06* | (2006.01) |
| *G01S 7/35* | (2006.01) |
| *G01S 13/04* | (2006.01) |
| *G01S 13/56* | (2006.01) |
| *H04B 7/024* | (2017.01) |
| *H04L 1/1829* | (2023.01) |
| *H04L 5/00* | (2006.01) |
| *H04W 24/10* | (2009.01) |

(52) U.S. Cl.
CPC ........... *H04B 7/0626* (2013.01); *H04B 7/024* (2013.01); *H04L 1/1832* (2013.01); *H04W 24/10* (2013.01); *G01S 7/352* (2013.01)

(58) Field of Classification Search
None
See application file for complete search history.

(56) References Cited

U.S. PATENT DOCUMENTS

| | | | | |
|---|---|---|---|---|
| 5,099,248 A | * | 3/1992 | Brommer | ................. G01S 3/48 342/423 |
| 2009/0089266 A1 | * | 4/2009 | Gollapudi | ......... G06F 16/24539 |

(Continued)

OTHER PUBLICATIONS

Xiang Li et al., Training-Free Human Vitality Monitoring Using Commodity Wi-Fi Devices, Sep. 2018 (Year: 2018).*

(Continued)

*Primary Examiner* — Jeffrey M Rutkowski
*Assistant Examiner* — Ning Li
(74) *Attorney, Agent, or Firm* — Knobbe, Martens, Olson & Bear, LLP (57) ABSTRACT

A method and a system are for non-contact determination of a detection boundary. A Wi-Fi receiving device simultaneously receives data packets by using any two antennas, and measures channel state information; conjugate multiplication is performed on the CSI measured at a moment corresponding to reception of the two antennas, to obtain a new CSI signal stream; a time window with the length M is selected from the new CSI signal stream, and M CSI samples in the time window are collected, to form a conjugate set; the mean of the conjugate set is subtracted from all the samples in the conjugate set, to obtain a zero-mean conjugate set; N zero-mean conjugate sets are obtained for CSI on N sub-carriers simultaneously transmitted; and probability distribution fitting is performed on the absolute values of all elements in the N zero-mean conjugate sets, to calculate a boundary detection feature.

12 Claims, 2 Drawing Sheets

(56) References Cited

U.S. PATENT DOCUMENTS

| | | | | |
|---|---|---|---|---|
| 2012/0148102 | A1* | 6/2012 | Moriguchi | G06T 7/277 382/103 |
| 2013/0266208 | A1* | 10/2013 | Lim | G06T 7/12 382/154 |
| 2017/0315810 | A1* | 11/2017 | Eickemeyer | G06F 9/322 |
| 2019/0020425 | A1* | 1/2019 | Zhang | H04W 56/0035 |
| 2022/0414920 | A1* | 12/2022 | Mori | G06V 20/58 |

OTHER PUBLICATIONS

Shengjie Li et al., AR-Alarm: An Adaptive and Robust Intrusion Detection System Leveraging CSI from Commodity Wi-Fi, 2017 (Year: 2017).*

Youwei Zeng et al., FullBreathe: Full Human Respiration Detection Exploiting Complementarity of CSI Phase and Amplitude of WiFi Signals, Sep. 2018 (Year: 2018).*

Kosba et al., "RASID: A Robust WLAN Device-free Passive Motion Detection System", PerCom2012, pp. 180-189 (2012).

Li et al., "Training-Free Human Vitality Monitoring Using Commodity Wi-Fi Devices", IMWUT, 2(3), pp. 1-25 (2018).

Qian et al., "PADS: Passive detection of moving targets with dynamic speed using PHY layer Information", ICPDS14, pp. 1-8 (2014).

Wu et al., "Non-invasive Detection of Moving and Stationary Human with WiFi", J-SAC15, 33(11), pp. 2329-2342 (2015).

Xiao et al., "FIMD: Fine-grained Device-free Motion Detection", ICPDS12, pp. 229-235 (2012).

Youssef et al., "Challenges: Device-free Passive Localization for Wireless Environments", MobiCom2007, pp. 222-229 (2007).

* cited by examiner

METHOD, SYSTEM, COMPUTER DEVICE, AND STORAGE MEDIUM FOR NON-CONTACT DETERMINATION OF A SENSING BOUNDARY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present application relates to a technique for determining a sensing boundary, in particular to a method, a system, a computer device, and a storage medium for non-contact determination of a sensing boundary based on commercial Wireless Local Area Network devices.

Description of the Related Art

The non-contact determination of a sensing boundary refers to a method of determining a sensing boundary of a specific area to implement the detection of a target in the area on the premise that the target has no contact behavior with a device. For example, an intrusion detection system for a room needs to define a sensing boundary of the room, so as to warn an intruder who crosses the boundary. On the other hand, by defining the sensing boundary of the room, an area (bedroom or bathroom) where the target is located in can be determined, thereby implementing accurate area detection for the target. Currently, Wireless Local Area Network (Wi-Fi) devices such as mobile phones, tablets, computers, and smart watches are widely used in daily life. The use of Wi-Fi devices for non-contact sensing of a target attracts much attention of people. An important premise for detecting activities of a target in a specific area is to determine a sensing boundary of the area.

In 2007, the American Moustafa Youssef proposed a solution (Challenges: Device-free Passive Localization for Wireless Environments. MobiCom2007. pp. 222-229), in which the detection of target activities in an environment is implemented by means of a change in the absolute value of the Received Signal Strength Indicator (RSSI, reflecting the strength of a received signal) in a commercial Wi-Fi network card. In 2012, the Egyptian Ahmed E. Kosba (RASID: A Robust WLAN Device-free Passive Motion Detection System. PerCom2012. pp. 180-189) further proposed the use of the standard deviation of the RSSI to implement the detection of the target activity. However, since the Wi-Fi RSSI signal is significantly affected by noise and multipath environments, the range of the change in the RSSI is very large even in a stable environment having no human activity; so no matter the absolute value of the RSSI or the standard deviation of the RSSI is used to detect the human activity, the stability is relatively poor in both cases, and moreover, changes in the RSSI resulting from noise and environmental factors may lead to many false alarms produced in the methods described above. On the other hand, these methods can only determine whether there is a target moving in a Wi-Fi environment; since the Wi-Fi signal has relatively large coverage and the coverage boundary is unclear, these methods cannot define an accurate sensing boundary to implement target detection in a specific area.

In 2012, the Chinese Jiang Xia (FIMD: Fine-grained Device-free Motion Detection, ICPDS12. pp. 229-235) proposed a solution: an activity of a target in an environment may lead to a change in amplitudes of Wi-Fi Channel State Information (CSI, reflecting the amplitude attenuation and phase shift of a received signal transmitted from a transmitting terminal to a receiving terminal); on this basis, an autocorrelation matrix of the CSI amplitudes is constructed, and a change in the characteristic value of the matrix is used to detect the activity of the target in the environment. In 2014, the Chinese Kun Qian (PADS: Passive detection of moving targets with dynamic speed using PHY layer information, ICPDS14. pp. 1-8) proposed a solution: by using the CSI amplitude and the corrected phase information in combination, autocorrelation square matrices of the amplitude and the corrected phase are constructed, and the detection accuracy of the target activity is further improved by combining the maximum characteristic values of the two square matrices. In 2015, the Chinese Wu Chenshu (Non-invasive Detection of Moving and Stationary Human with WiFi. J-SAC15. 33(11). pp. 2329-2342) proposed a solution: first, a dynamic target is distinguished from a static environment by means of the variance of the CSI amplitude envelope, and then the regular effect of fluctuation of the chest generated when a person breathes on signals is used to further detect the existence of a static target. In 2018, the Chinese Xiang Li (Training-Free Human Vitality Monitoring Using Commodity Wi-Fi Devices. IMWUT. 2(3). Pp. 1-25) proposed a solution: a phase error is eliminated by means of the CSI conjugate multiplication between antennas, and the Doppler energy characteristics reflecting a human moving or stationary state are extracted by means of a phase change generated after the multiplication, thereby implementing the robust detection of the existence of a dynamic target. In the above methods, the detection of target activities in a Wi-Fi transmission range is implemented by means of more fine-grained CSI information; however, a sensing boundary still cannot be clearly determined, and whether the activity of a target occurs in a specified sensing area cannot be accurately determined.

SUMMARY OF THE INVENTION

Regarding the above problems, the present application aims at providing a method, a system, a computer device, and a storage medium for non-contact determination of a sensing boundary. The method is based on a commercial Wireless Local Area Network device, and requires no contact between a monitored target and any devices, just uses two Wi-Fi devices and a wall structure in the daily environment to accurately determine a sensing boundary and define a clear Wi-Fi sensing area.

In order to achieve the above objectives, the present application adopts the following technical solution: a method for non-contact determination of a sensing boundary comprises the following steps: S1. simultaneously receiving data packets, by a Wi-Fi receiving device, using two antennas, and measuring Channel State Information; S2. performing conjugate multiplication on the CSI of the two antennas at each instant, to obtain a new CSI signal stream; S3. selecting a time window with the length M from the new CSI signal stream at the instant $t_0$, and collecting M CSI samples in the time window, to form a conjugate set $S(t_0)$; S4. subtracting the mean of $S(t_0)$ from all the samples in the conjugate set $S(t_0)$, to obtain a zero-mean conjugate set; S5.

repeating steps S2-S4 for CSI on N sub-carriers simultaneously transmitted, to obtain N zero-mean conjugate sets; and performing probability distribution fitting on the absolute values of all elements in the N zero-mean conjugate sets, to obtain a boundary sensing feature $\sigma(t_0)$; and S6. accurately classifying, according to the boundary sensing feature $\sigma(t_0)$, activities inside and outside a sensing area by means of a boundary formed by walls and extension lines thereof.

Preferably, the new CSI obtained after the conjugate multiplication is:

$$H_{conj} = H_1(t_0+t) * H_2^*(t_0+t) \approx$$

$$A_{s1}A_{s2}e^{j(\varphi_{s1}-\varphi_{s2})} + A_{s1}\sum_d^D \alpha_d(t_0)e^{j(\varphi_{s1}-\varphi_d^2(t_0+t))} + A_{s2}\sum_d^D \alpha_d(t_0)e^{j(\varphi_d^1(t_0+t)-\varphi_{s2})}$$

in the formula, $H_{conj}$ represents the new CSI obtained after the conjugate multiplication, $H_1(t_0+t)$ represents CSI of a first antenna measured at the instant $t_0+t$, $H_2(t_0+t)$ represents CSI of a second antenna measured at the instant $t_0+t$, $H_2^*(t_0+t)$ represents a conjugate of $H_2(t_0+t)$, $A_{s1}$ represents amplitude of a merged static signal of the first antenna, $A_{s2}$ represents amplitude of a merged static signal of the second antenna, $\alpha_d(t_0)$ represents amplitude attenuation of a d-th dynamic signal at the instant $t_0$, $\varphi_{s1}$ represents phase offset of the merged static signal of the first antenna, $\varphi_{s2}$ represents phase offset of the merged static signal of the second antenna, $\varphi_d^1(t_0+t)$ represents phase offset of a dynamic signal of the first antenna at the instant $t_0+t$, and $\varphi_d^2(t_0+t)$ represents phase offset of a dynamic signal of the second antenna at the instant $t_0+t$.

Preferably, the conjugate set $S(t_0)$ is:

$$S(t_0)=[H_1(t_0)*H_2^*(t_0), H_1(t_0+\Delta t)*H_2^*(t_0+\Delta t), \ldots H_1(t_0+M\Delta t)*H_2^*(t_0+M\Delta t)]$$

wherein [0, $\Delta t$, ..., M$\Delta t$] are CSI sampling intervals relative to the instant $t_0$, and $\Delta t$ is the sampling time.

Preferably, a k-th element $x(t_0+k\Delta t)$ in the zero-mean conjugate set is:

$$x(t_0+k\Delta t) = A_{s1}\sum_d^D \alpha_d(t_0)e^{j\Psi_d(t_0+k\Delta t)} + A_{s2}\sum_d^D \alpha_d(t_0)e^{j\Omega_d(t_0+k\Delta t)} =$$

$$R(t_0+k\Delta t) + i*I(t_0+k\Delta t)$$

wherein $\overline{S(t_0)}$ is the mean of the conjugate set $S(t_0)$, $\Psi_d(t_0+k\Delta t)=\omega_{s1}-\varphi_d^2(t_0+k\Delta t)$, $\Omega_d(t_0+k\Delta t)=\varphi_d^1(t_0+k\Delta t)-\varphi_{s2}$, and $R(t_0+k\Delta t)$ and $I(t_0+k\Delta t)$ are respectively the real part and imaginary part of $x(t_0+k\Delta t)$ when $x(t_0+k\Delta t)$ is a complex number.

Preferably, the boundary sensing feature $\sigma(t_0)$ is obtained by performing probability distribution fitting on the absolute values $|x(t_0+k\Delta t)|$ of all the elements in the set, and a mode of the probability distribution fitting is Rayleigh distribution, Rice distribution, or lognormal distribution.

Preferably, in the step S6, the boundary sensing feature $\sigma(t_0)$ is compared with a preset boundary determination threshold $\delta_{th}$; if $\sigma(t_0)>\delta_{th}$, it is determined that the current activity is within the sensing area; and if $\sigma(t_0)<\delta_{th}$, it is determined that the current activity is outside the sensing area.

A system for non-contact determination of a sensing boundary comprises a receiving and measuring module, a conjugate multiplication module, a conjugate set module, a zero-mean conjugate set module, a boundary sensing feature calculation module, and a boundary determination module, wherein in the receiving and measuring module, a Wi-Fi receiving device simultaneously receives data packets by two antennas, and measures Channel State Information (CSI); the conjugate multiplication module performs conjugate multiplication on the CSI of the two antennas at each instant, to obtain a new CSI signal stream; the conjugate set module selects a time window with the length M from the new CSI signal stream at the instant $t_0$, and collects M CSI samples in the time window, to form a conjugate set $S(t_0)$; the zero-mean conjugate set module subtracts the mean of $S(t_0)$ from all the samples in the conjugate set $S(t_0)$, to obtain a zero-mean conjugate set; the boundary sensing feature calculation module obtains, by means of the conjugate multiplication module, the conjugate set module, and the zero-mean conjugate set module, N zero-mean conjugate sets for CSI on N sub-carriers simultaneously transmitted, and performs probability distribution fitting on the absolute values of all elements in the N zero-mean conjugate sets, to obtain a boundary sensing feature $\sigma(t_0)$; and the boundary determination module accurately classifies, according to the boundary sensing feature $\sigma(t_0)$, activities inside and outside a sensing area by means of a boundary formed by walls and extension lines thereof.

An indoor intrusion detection system based on the method for non-contact determination of a sensing boundary is built by means of the above method on the basis of the above system. The indoor intrusion detection system comprises a receiving and measuring module, a conjugate multiplication module, a conjugate set construction module, a zero-mean conjugate set construction module, a boundary sensing feature calculation module and further comprises a moving and stationary detection module and a feature-fusion intrusion determination module, wherein the moving and stationary detection module extracts a feature $Dmotion(t_0)$ for detecting a moving and stationary state of an sensing target from the new CSI signal stream obtained after CSI conjugate multiplication/division transformation or an original CSI signal; and the feature-fusion intrusion determination module determines whether there is an intruder indoors by combining the boundary sensing feature $\sigma(t_0)$ and the moving and stationary detection feature $Dmotion(t_0)$.

Preferably, in the feature-fusion intrusion determination module, a method for determining whether there is an intruder indoors is as follows:

if $\sigma(t_0)-\sigma(t_{-1})>\rho_{th1}$, it indicates that an intruder intrudes into a room, $\sigma(t_{-1})$ represents the magnitude of a boundary sensing feature calculated at a last instant of $t_0$, $\rho_{th1}$ is a threshold for measuring the magnitude of a rise jump; if $\sigma(t_0)_0-\sigma(t_{-1})<\rho_{th2}$ and $Dmotion(t_0)>\mu_{th}$, wherein $\rho_{th2}$ is a threshold for measuring the magnitude of a fall jump and $\mu_{th}$ is a threshold for moving and stationary determination, it indicates that the intruder leaves the room; and if $\rho_{th2}<\sigma(t_0)-\sigma(t_{-1})<\rho_{th1}$, a moving/stationary state of the intruder is determined by means of combining the moving and stationary detection feature, that is, if $Dmotion(t_0)<\mu_{th}$, it indicates that the detected target is in a static state indoors, and if $Dmotion(t_0)>\mu_{th}$, it indicates that the intruder is in an moving state indoors.

An area detection system based on the method for non-contact determination of a sensing boundary is built by means of the method for non-contact determination of a sensing boundary on the basis of the above system. The area detection system comprises a receiving and measuring module, a conjugate multiplication module, a conjugate set construction module, a zero-mean conjugate set construction module, a boundary sensing feature calculation module and further comprises an area code table building module, a global area code obtaining module, and an area detection module.

Preferably, in the area code table building module, a method for building the code table is as follows: when a target moves in an area A, states of all Wi-Fi devices in the area A are set to 1, states of Wi-Fi devices in other areas are set to 0, and accordingly, 0/1 code situations of states of different devices in a case where the target moves in all areas are obtained, to form the area code table.

Preferably, in the global area code obtaining module, a method for obtaining a global area code is as follows: if $\sigma_d(t_0) > \delta_{th}$, a current state of the device is set to 1, if $\sigma_d(t_0) < \delta_{th}$, the current state of the device is set to 0, and finally, states of different devices are combined to obtain a current global area code, wherein $\sigma_d(t_0)$ is the boundary feature of a $d_{th}$ device for distinguishing between activities inside and outside the walls Preferably, in the area detection module, a method for identifying a target current area is as follows: if the global area code can be found in the area code table, the target current area is updated to the corresponding area in area code table; and if the global area code cannot be found in the area code table, the area result of the last instant is an area where a target is currently located.

Preferably, in the area detection module, a state of a Wi-Fi device in an area is set to 1 only when the target moves across the boundary, when the target keeps stationary or moves in a corner of the area, states corresponding to all Wi-Fi devices in all areas may be set to 0, to form a combined code (0 . . . 00), which is not in the area code table, and in this case, a state of the area where the target is located at the last instant is maintained as the current area state.

A computer-readable storage medium comprises a computer program stored thereon, wherein the method according to the above one or more embodiments is implemented when a processor executes the computer program.

The present invention has the following advantages due to the above technical solutions: 1. in the present invention, by using a commercial Wi-Fi network card and by means of walls in a natural environment, a sensing boundary can be determined accurately and a clear sensing area can be defined, without contact between a monitored target and any devices, thereby further serving upper layer applications such as but not limited to intrusion detection, localization, and activity recognition. 2. The present invention has low requirements for devices, and is implemented on some common commercial wireless signal transceivers without changing the hardware. Therefore, the technical solutions provided by the present invention can be deployed on common commercial wireless devices (such as Wi-Fi network cards, Wi-Fi routers, RFID readers, etc.), and the implementation is fast, convenient, low-cost, and high-efficiency.

DETAILED DESCRIPTION OF THE PREFERRED EMBODIMENT

The present application provides a method for non-contact determination of a sensing boundary. In an ordinary home environment, the partition of a sensing area is generally at a room-level, and rooms are usually separated from each other by walls. In this method, by capturing differences in Wi-Fi signals respectively corresponding to activities of a moving target outside and inside walls, the walls in the daily environment can be necessarily used to partition the sensing area. Accordingly, in the present application, a boundary sensing feature extracted from a CSI conjugate multiplied signal of two antennas of a Wi-Fi receiving device reflects the boundary sensing feature.

the reflected signal strength of the moving target, effectively distinguishing between a direct dynamic signal (not blocked) and an indirect dynamic signal (blocked by a wall) generated by reflection of the moving target, and thereby determining an accurate sensing boundary by means of the walls in the daily environment and extension lines thereof. The present application is described in detail below with reference to the drawings and embodiments.

A transmitting terminal of the present invention is a Wi-Fi signal transmitter in a Wi-Fi transceiving environment, and a receiving terminal is a Wi-Fi signal receiver corresponding to the transmitting terminal. A natural wall in the environment assists in determining a sensing boundary, and a detected target does not need to wear any device. The sensing boundary is determined by means of Wi-Fi transceiver devices and the walls in the environment, by a method including the following steps:

S1. A Wi-Fi receiving device simultaneously receives data packets by means of two antennas, and measures Channel State Information (CSI).

The data packets are transmitted by a Wi-Fi transmitting device using one antenna. The Wi-Fi transmitting device can be a conventional commercial Wi-Fi device provided with one or more antennas. The Wi-Fi receiving device can be a conventional commercial Wi-Fi device provided with two or more antennas. The Wi-Fi transmitting device can be any device that includes a Wi-Fi network card, such as a mobile phone, a tablet, a computer, and a smart watch. The Wi-Fi receiving device and the Wi-Fi transmitting device adopt the same frequency, and common commercial devices generally support connection to three antennas, so the requirement of using one antenna at the transmitting terminal and two antennas at the receiving terminal can be met.

The Channel State Information (CSI) is used to describe changes in the amplitude and phase of a signal after being transmitted via a wireless channel. For example, on a commercial Wi-Fi device, the CSI reflects amplitude attenuation and phase drift of a wireless signal transmitted from a transmitting terminal to a receiving terminal via a wireless channel. At each sampling instant $t_0+t$, each receiving antenna collects the respective Channel State Information, and the Channel State Information of one antenna is expressed as follows:

$$H(t_0+t) = e^{j\theta_{offset}}(A_s e^{j\varphi_s} + \Sigma_d{}^D \alpha_d(t_0+t)) e^{j\varphi_d(t_0+t)} \quad (1)$$

In the formula, $\theta_{offset}$ represents a phase error of a phase of the CSI resulting from clock asynchronism between the Wi-Fi transmitting terminal and receiving terminal; $A_s e^{j\varphi_s}$ represents a static signal generated by the superposition of a direct path in the environment and reflection from a static object (furniture, a ceiling, etc.) ($A_s$ represents amplitude of the static signal, and $\varphi_s$ represents phase shift of the static signal); $\Sigma_d{}^D \alpha_d(t_0+t)) e^{j\varphi_d(t_0+t)}$ represents the superposition of all dynamic signals generated by reflection from a moving target, wherein when the moving target moves inside walls (in a sensing area), these signals are direct dynamic signals that are not blocked by the walls, and when the moving target moves outside the walls (outside the sensing area), these signals are blocked by the walls and thus become indirect dynamic signals; $t_0$ represents the initial instant, and t represents a time period; $\alpha_d(t_0+t)$ represents amplitude attenuation of a d-th dynamic signal at the instant $t_0+t$, $\varphi_d(t_0+t)$ represents phase shift of the d-th dynamic signal, and D represents the total number of dynamic paths.

S2. Conjugate multiplication is performed on the CSI of the two antennas at each instant, to eliminate a phase error and obtain a new CSI signal stream.

In formula 1, due to the clock asynchronism between the Wi-Fi transmitting terminal and receiving terminal, the phase error $\theta_{offset}$ is brought to the phase of the CSI, and the phase error changes with the time, so a boundary sensing feature cannot be directly extracted from the CSI. Since phase errors between different antennas on the same network card are the same, the phase error resulting from the asynchronism between the receiving and transmitting devices can be eliminated by means of conjugate multiplication on the CSI measured at the same sampling time by two antennas. The new CSI obtained after the conjugate multiplication is expressed as follows:

$$H_{conj} = H_1(t_0+t) * H_2^*(t_0+t) \approx A_{s1}A_{s2}e^{j(\varphi_{s1}-\varphi_{s2})} + \quad (2)$$

$$A_{s1}\sum_d^D \alpha_d(t_0)e^{j(\varphi_{s1}-\varphi_d^2(t_0+t))} + A_{s2}\sum_d^D \alpha_d(t_0)e^{j(\varphi_d^1(t_0+t)-\varphi_{s2})}$$

In the formula, $H_{conj}$ represents the new CSI obtained after the conjugate multiplication, $H_1(t_0+t)$ represents CSI of a first antenna measured at the instant $t_0+t$, $H_2(t_0+t)$ represents CSI of a second antenna measured at the instant $t_0+t$, $H_2^*(t_0+t)$ represents a conjugate of $H_2(t_0+$, $A_{s1}$ represents amplitude of the merged static signal of the first antenna, $A_{se}$ represents amplitude of the merged static signal of the second antenna, $\alpha_d(t_0)$ represents amplitude attenuation of a d-th dynamic signal at the instant $t_0$, $\varphi_{s1}$ represents phase offset of the merged static signal of the first antenna, $\varphi_{s2}$ represents phase offset of the merged static signal of the second antenna, $\varphi_d^1(t_0+t)$ represents phase offset of a dynamic signal of the first antenna at the instant $t_0+t$, and $\varphi_d^2(t_0+t)$ represents phase offset of a dynamic signal of the second antenna at the instant $t_0+t$.

The new CSI signal $H_{conj}$ obtained after the conjugate multiplication eliminates the phase error, and on the other hand, enhances the energy attenuation of a target reflected signal due to wall blocking, thereby amplifying a difference between a direct dynamic signal and an indirect dynamic signal.

S3. A time window with the length M is selected from the new CSI signal stream at the instant $t_0$, and M CSI samples in the time window are collected, to form a conjugate set $S(t_0)$:

$$S(t_0)=[H_1(t_0)*H_2^*(t_0), H_1(t_0+\Delta t)*H_2^*(t_0+\Delta t), \ldots \\ H_1(t_0+M\Delta t)*H_2^*(t_0+M\Delta t)] \quad (3)$$

wherein [0, $\Delta t$, ..., M$\Delta t$] are CSI sampling intervals relative to the instant $t_0$, and $\Delta t$ is an interval sampling time.

S4. The mean of $S(t_0)$ is subtracted from all the samples in the conjugate set $S(t_0)$, to obtain a zero-mean conjugate set, wherein $x(t_0+k\Delta t)$ is a k-th element in the zero-mean conjugate set obtained after the mean subtraction:

$$x(t_0+k\Delta t) \in S(t_0) - \overline{S(t_0)} x(t_0+k\Delta t) = \quad (3)$$

$$A_{s1}\sum_d^D \alpha_d(t_0)e^{j\Psi_d(t_0+k\Delta t)} + A_{s2}\sum_d^D \alpha_d(t_0)e^{j\Omega_d(t_0+k\Delta t)} = $$

$$R(t_0+k\Delta t) + i*I(t_0+k\Delta t)$$

wherein, $\overline{S(t_0)}$ is the mean of the conjugate set $S(t_0)$, $\Psi_d(t_0+k\Delta t)=\omega_{s1}-\varphi_d^2(t_0+k\Delta t)$, $\Omega_d(t_0+k\Delta t)=\varphi_d^1(t_0+k\Delta t)-\varphi_{s2}$, $R(t_0+k\Delta t)$ and $I(t_0+k\Delta t)$ are respectively the real part and imaginary part of $x(t_0+k\Delta t)$ when $x(t_0+k\Delta t)$ is a complex number, and i represents a symbol of the imaginary part of the complex number.

S5. Steps S2-S4 are repeated for CSI on N sub-carriers simultaneously transmitted, to obtain N zero-mean conjugate sets; and probability distribution fitting is performed on the absolute values of all elements in the N zero-mean conjugate sets, to obtain a boundary sensing feature $\sigma(t_0)$.

A commercial Wi-Fi device performs communication transmission in the manner of Orthogonal Frequency Division Multiplexing (OFDM), which can support simultaneous transmission of a plurality of sub-carriers. Therefore, the CSI conjugate signal streams of the N sub-carriers can be obtained by performing conjugate multiplication on each corresponding sub-carrier of the two antennas, and the N zero-mean conjugate sets are obtained by repeating steps S2-S4 for each sub-carrier.

The boundary sensing feature $\sigma(t_0)$ is obtained by performing probability distribution fitting on the absolute values $|x(t_0+k\Delta t)|$ of all the elements in the sets, and a mode of the probability distribution fitting can be Rayleigh distribution, Rice distribution, or lognormal distribution. In this embodiment, the Rayleigh distribution is preferably used to obtain the boundary sensing feature $\sigma(t_0)$:

$$\sigma(t_0) = \sqrt{\frac{1}{2M*N}\sum_{f=1}^N \sum_{k=1}^M |x_f(t_0+k\Delta t)|^2} \quad (4)$$

In the formula, f is a serial number of a subcarrier.

Figure 1:
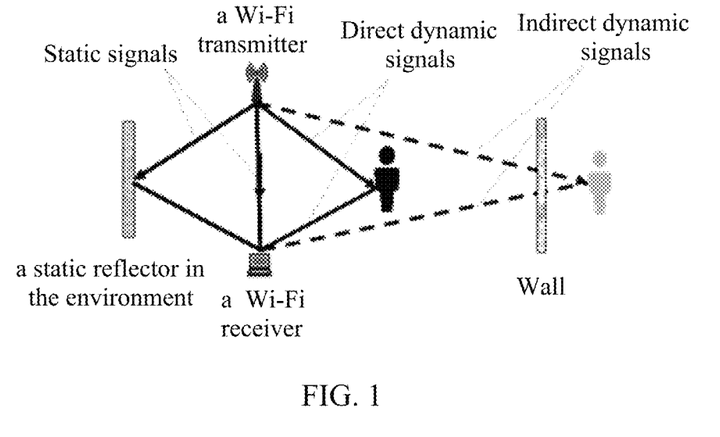
FIG. 1 is a schematic diagram of Wi-Fi signal transmission.

S6. According to the boundary sensing feature $\sigma(t_0)$, activities inside and outside a sensing area are accurately classified by means of a sensing boundary formed by walls and extension lines thereof: the boundary sensing feature $\sigma(t_0)$ is compared with a preset boundary determination threshold $\delta_{th}$; if $\sigma(t_0)>\delta_{th}$, it is determined that a current activity is within the sensing area (within the walls); and if $\sigma(t_0)<\delta_{th}$, it is determined that the current activity is outside the sensing area (outside the walls) (as shown in FIG. 1), thereby the activities inside and outside the sensing area are accurately classified by means of the sensing boundary formed by the walls and the extension lines thereof.

Embodiment 1

In the embodiment based on the present application, a daily Wi-Fi device is used as a receiving terminal (such as a mobile phone, a router, a computer, and a television, and in this embodiment, a minicomputer is taken as an example, but it is not limited to the minicomputer), and two antennas are used to receive a signal. A common Wi-Fi device (such as a mobile phone, a router, a computer, and a television, in this embodiment, a router is taken as an example, but it is not limited to the router) is used as a signal transmitting terminal, and one antenna is used to transmit a signal. The method for determining a sensing boundary provided by the present application is as follows:

1) System building

A router is used as a Wi-Fi transmitting device, and a minicomputer equipped with a commercial Wi-Fi network card supporting two antenna interfaces is used as a receiving device, wherein the two antenna interfaces are respectively connected to two antennas. In an example of the present application, an Intel 5300 network card is used to build the system, and the Wi-Fi transmitting and receiving devices work at a frequency of 5 GHz and communicate by means of a bandwidth of 20 MHz. This example consists of one transmitting terminal, one receiving terminal, and one server.

Figure 2:
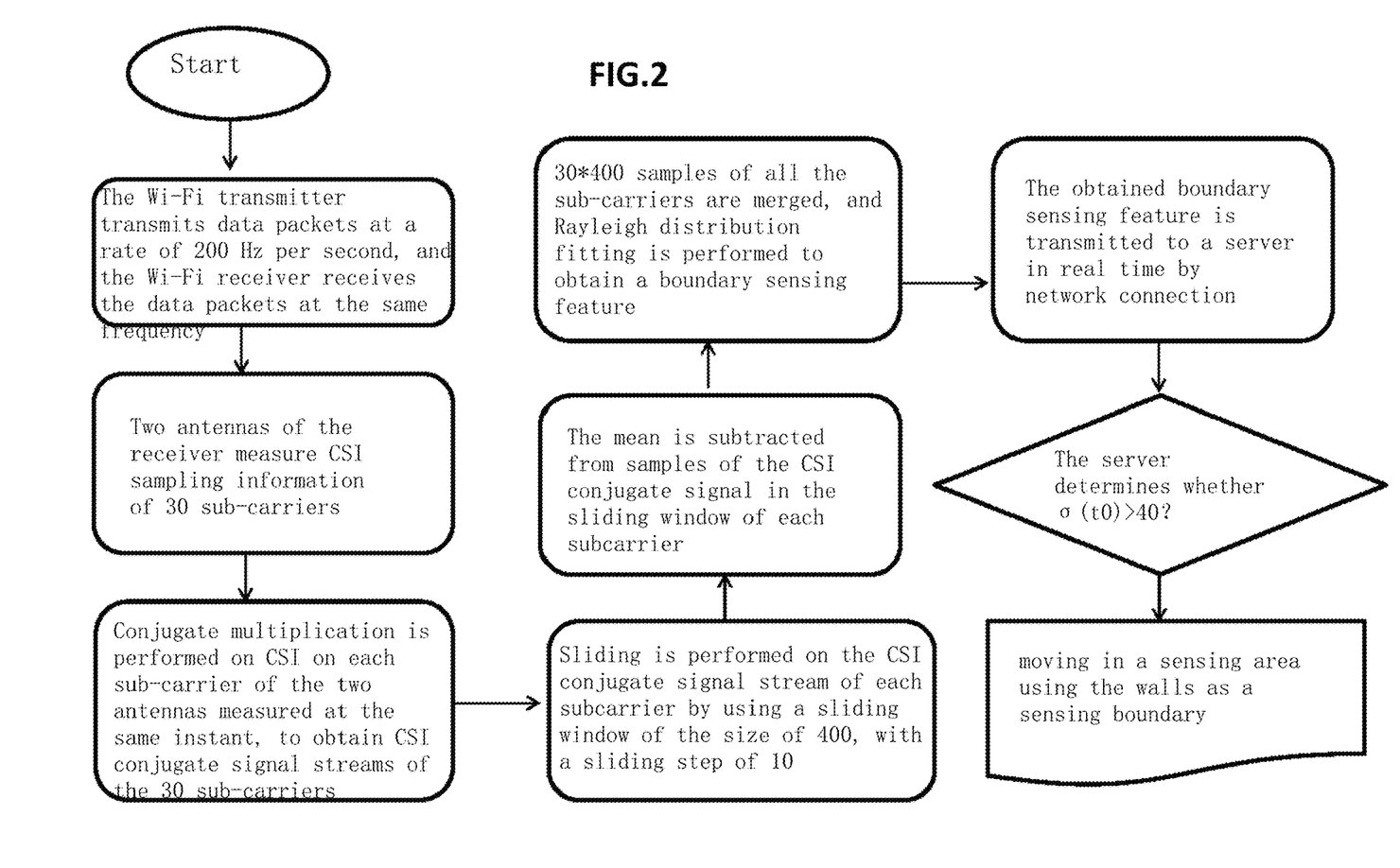
FIG. 2 is a block diagram of an example implementation process of a method for determining a sensing boundary provided by the present application.

A flow of the method of determining a sensing boundary by using the built system is shown in FIG. 2, and includes the following steps:

2) The Wi-Fi signal transmitting device transmits data packets by means of 30 sub-carriers at a rate of 200 Hz per second; two antennas of the Wi-Fi receiving device simultaneously receive the data packets on the plurality of sub-carriers, and measure CSI of each data packet transmitted by each sub-carrier.

3) For each sub-carrier of the 30 sub-carriers, conjugate multiplication is performed on CSI measured by the two antennas of the receiving device at the same moment, to eliminate a phase error and obtain CSI conjugate signal streams of the 30 sub-carriers.

4) Sliding processing is performed on the CSI conjugate signal streams of the 30 sub-carriers by using a sliding window of the size of 400, with a sliding step of 10.

5) The mean of samples in a current window is subtracted from each of 400 CSI conjugate signal samples in the sliding window for each subcarrier.

6) The CSI conjugate signal samples of all the 30 sub-carriers are fused, to obtain a total of 30*400=12000 samples, and probability distribution fitting is performed on the absolute values of all the samples, to obtain a boundary sensing feature $\sigma(t_0)$, wherein a mode of the probability distribution fitting can be Rayleigh distribution, Rice distribution, or lognormal distribution. Preferably, a formula for fitting by using the Rayleigh distribution is as follows:

$$\sigma(t_0) = \sqrt{\frac{1}{2*12000}\sum_{f=1}^{30}\sum_{k=1}^{400}|x_f(t_0 + \Delta t_k)|^2}$$

7) The receiving device transmits the calculated boundary sensing feature in each window to a designated port on a server in real time by means of socket connection.

8) The server monitors the designated port in real time and compares $\sigma(t_0)$ with a boundary sensing threshold $\delta_{th}=40$ once receiving $\sigma(t_0)$, wherein if $\sigma(t_0)>40$, it indicates that a target moves in a sensing area within walls, thereby determining the sensing boundary of the area where the target is located by means of the walls and extension lines thereof.

The present application further provides a system for non-contact determination of a sensing boundary, including a receiving and measuring module, a conjugate multiplication module, a conjugate set construction module, a zero-mean conjugate set construction module, a boundary sensing feature calculation module, and a boundary determination module.

In the receiving and measuring module, a Wi-Fi receiving device simultaneously receives data packets by two antennas, and measures Channel State Information (CSI).

The conjugate multiplication module performs conjugate multiplication on the CSI of the two antennas at each instant, to obtain a new CSI signal stream.

The conjugate set construction module selects a time window with the length M from the new CSI signal stream at the instant $t_0$, and collects M CSI samples in the time window, to form a conjugate set $S(t_0)$.

The zero-mean conjugate set construction module subtracts the mean of $S(t_0)$ from all the samples in the conjugate set $S(t_0)$, to obtain a zero-mean conjugate set.

The boundary sensing feature calculation module obtains, by means of the conjugate multiplication module, the conjugate set module, and the zero-mean conjugate set module, N zero-mean conjugate sets for CSI on N sub-carriers simultaneously transmitted, and performs probability distribution fitting on the absolute values of all elements in the N zero-mean conjugate sets, to obtain a boundary sensing feature $\sigma(t_0)$.

The boundary determination module accurately classifies, according to the boundary sensing feature $\sigma(t_0)$, activities inside and outside a sensing area by means of the boundary formed by walls and extension lines thereof.

Embodiment 2

The present application further provides an application based on the method for non-contact determination of the sensing boundary of the present application, which is specifically an indoor intrusion detection system based on the method for non-contact determination of the sensing boundary. The system is built on the basis of the above system for non-contact determination of the sensing boundary of the present application and includes a receiving and measuring module, a conjugate multiplication module, a conjugate set construction module, a zero-mean conjugate set construction module, a boundary sensing feature calculation module, a moving and stationary detection module, and a feature-fusion and intrusion determination module.

In the receiving and measuring module, a Wi-Fi receiving device simultaneously receives data packets by two antennas, and measures Channel State Information.

The conjugate multiplication module performs conjugate multiplication on the CSI of the two antennas at each instant, to obtain a new CSI signal stream.

The conjugate set construction module selects a time window with the length M from the new CSI signal stream at the instant $t_0$, and collects M CSI samples in the time window, to form a conjugate set $S(t_0)$.

The zero-mean conjugate set construction module subtracts the mean of $S(t_0)$ from all the samples in the conjugate set $S(t_0)$, to obtain a zero-mean conjugate set.

The boundary sensing feature calculation module obtains, by means of the conjugate multiplication module, the conjugate set module, and the zero-mean conjugate set module, N zero-mean conjugate sets for CSI on N sub-carriers simultaneously transmitted, and performs probability distribution fitting on the absolute values of all elements in the N zero-mean conjugate sets, to obtain a boundary sensing feature $\sigma(t_0)$.

The moving and stationary detection module extracts a feature $Dmotion(t_0)$ for detecting a moving/stationary state of an active target from the new CSI signal stream obtained after CSI conjugate multiplication/division transformation or an original CSI signal. Preferably, a Doppler energy feature Dmotion($t_0$) is extracted by means of a DopplerMUSIC algorithm, or an amplitude autocorrelation feature Dmotion($t_0$) is extracted by means of a CSI amplitude autocorrelation algorithm.

The feature-fusion and intrusion determination module determines whether there is an intruder indoors by combining the boundary sensing feature $\sigma(t_0)$ and the moving and stationary detection feature Dmotion($t_0$). Specifically, if the boundary sensing feature undergoes an obvious jump, that is, if $\sigma(t_0)-\sigma(t_{-1})>\rho_{th1}$ ($\sigma(t_{-1})$ represents the magnitude of a boundary sensing feature at a previous instant of $t_0$ and $\rho_{th1}$ is a threshold for measuring the magnitude of a rise jump), it indicates that an intruder intrudes into a room; if $\sigma(t_0)-\sigma(t_{-1})<\rho_{th2}$ and Dmotion($t_0$)>$\mu_{th}$ ($\rho_{th2}$ is a threshold for measuring the magnitude of a fall jump and $\mu_{th}$ is a threshold for moving and stationary determination), it indicates that the intruder leaves the room; and if $\rho_{th2}<\sigma(t_0)-\sigma(t_{-1})<\rho_{th1}$, a moving/stationary state of the intruder is determined by combining the moving and stationary detection feature, that is, if Dmotion($t_0$)<$\mu_{th}$, it indicates that the detected target is in a static state indoors, and if Dmotion($t_0$)>$\mu_{th}$, it indicates that the intruder is in an active state indoors.

Embodiment 3

The present application further provides an application based on the method for non-contact determination of the sensing boundary of the present application, which is specifically a non-contact indoor area detection system implemented by means of a sensing boundary determined by using a plurality of devices. The system is built on the basis of the above system for non-contact determination of the sensing boundary of the present application and includes, a receiving and measuring module, a conjugate multiplication module, a conjugate set construction module, a zero-mean conjugate set construction module, a boundary sensing feature calculation module, an area code table building module, a global area code obtaining module, and an area detection module.

The area code table building module obtains an area code table according to an area structure defined by walls and states of the Wi-Fi receiving devices pre-deployed in different areas. A method for building the area code table is as follows: a unique label is configured for each device in all areas, when a detected target moves in an area A, states of all Wi-Fi devices (RX 1) in the area A are set to 1, states of Wi-Fi devices (RX 2, RX 3 . . . RX4) in other areas are set to 0, and accordingly, 0/1 code situations of states of different devices in a case where the target moves in all areas are obtained by combining the states of all the devices, to form the area code table (as shown in Table 1), which is used as a reference for online area detection.

TABLE 1

Area code table

|  | RX 1 | RX2 | RX 3 | RX 4 |
|---|---|---|---|---|
| Area A | 1 | 0 | 0 | 0 |
| Area B | 0 | 1 | 0 | 0 |
| Area C | 0 | 0 | 1 | 0 |
| Area D | 0 | 0 | 0 | 1 |

In the receiving and measuring module, a Wi-Fi transmitting device transmits data packets by using one antenna; and one or more receiving devices in different areas receive the data packets from the transmitting terminal at the same time by using two antennas, and measure CSI information therefrom.

The conjugate multiplication module performs conjugate multiplication on the CSI measured of the two antennas at each instant, to obtain a new CSI signal stream.

The conjugate set construction module selects a time window with the length M from the new CSI signal stream at the instant $t_0$, and collects M CSI samples in the time window, to form a conjugate set S($t_0$).

The zero-mean conjugate set construction module subtracts the mean of S($t_0$) from all the samples in the conjugate set S($t_0$), to obtain a zero-mean conjugate set.

The boundary sensing feature calculation module obtains, by means of the conjugate multiplication module, the conjugate set module, and the zero-mean conjugate set module, N zero-mean conjugate sets for CSI on N sub-carriers simultaneously transmitted, and performs probability distribution fitting on the absolute values of all elements in the N zero-mean conjugate sets, to obtain a boundary sensing feature $\sigma(t_0)$.

The global area code obtaining module compares the boundary sensing feature $\sigma_d(t_0)$ of each device with a threshold value $\delta_{th}$, to obtain a current global area code. Specifically, if $\sigma_d(t_0)>\delta_{th}$, it indicates that a target moves in an area where the current device is located (movement/activity inside walls), so a state of the device is set to 1; if $\sigma_d(t_0)<\delta_{th}$, it indicates that the target moves outside the area where the current device is located (movement outside walls), so the current state of the device is set to 0; and finally, states of different devices are combined to obtain a current global area code.

The area detection module queries the area code table for a current global area code, to identify the target area. Specifically, if the global area code can be found in the area code table, the target current area is updated to a corresponding area in the area code table; and if the global area code cannot be found in the area code table, the target is assumed to be in the same area of the previous instant.

The present application further provides a computer device including a memory, a processor, and a computer program stored on the memory and executable by the processor, wherein the method for non-contact determination of the sensing boundary in the above embodiments is implemented when the processor executes the computer program.

The present application further provides a computer-readable storage medium with a computer program stored thereon, wherein the method for non-contact determination of the sensing boundary in the above embodiments is implemented when a processor executes the program.

Those skilled in the art should understand that the embodiments of the present application can be provided as a method, a system, or a computer program product. Therefore, the present application may adopt a form of a complete hardware embodiment, a complete software embodiment, or an embodiment combining software and hardware. Moreover, the present application may adopt the form of a computer program product implemented on one or more computer-usable storage media (including but not limited to a disk storage, a CD-ROM, an optical storage, etc.) containing computer-usable program codes.

The present application is described with reference to the flowcharts and block diagrams of the method, system, and computer program product according to the embodiments of the present application. It should be understood that each process and block in the flowcharts and block diagrams, and the combination of the process and block in the flowcharts and block diagrams can be implemented by computer program instructions. These computer program instructions can be provided to a general-purpose computer, a special-purpose computer, an embedded processor, or a processor of other programmable data processing devices to generate a machine, so that the instructions executed by the processor of the computer or other programmable data processing device produce a device for implementing the functions specified in one or more processes in a flowchart and one or more blocks in a block diagram.

These computer program instructions can also be stored in a computer-readable memory that can direct a computer or other programmable data processing devices to work in a specific manner, so that the instructions stored in the computer-readable memory produce an article of manufacture including an instruction apparatus. The instruction apparatus implements the functions specified in one or more processes in a flowchart and one or more blocks in a block diagram.

These computer program instructions can also be loaded onto a computer or other programmable data processing devices, to execute a series of operation steps on the computer or other programmable devices to produce computer-implemented processing, so that the instructions executed on a computer or other programmable devices provide steps for implementing the functions specified in one or more processes in a flowchart and one or more blocks in a block diagram.

The above embodiments of the present application are not used to limit the present application. Any modifications, equivalent replacements, improvements, etc. made within the spirit and principle of the present application fall within the scope of the pending claims of the present application.

What is claimed is:

1. A method for non-contact determination of a sensing boundary, comprising:
   S1. simultaneously receiving data packets by using two antennas of a Wi Fi receiving device, and measuring Channel State Information (CSI);
   S2. performing conjugate multiplication on the CSI of the two antennas at each sampling time, to obtain a new CSI signal stream;
   S3. selecting a time window with the length M from the new CSI signal stream at the instant $t_0$, and collecting M CSI samples in the time window, to form a conjugate set $S(t_0)$;
   S4. subtracting the mean of $S(t_0)$ from all the samples in the conjugate set $S(t_0)$, to obtain a zero-mean conjugate set;
   S5. repeating said S2-S4 for CSI on N sub-carriers simultaneously transmitted, to obtain N zero-mean conjugate sets; and performing probability distribution fitting on the absolute values of all elements in the N zero-mean conjugate sets, to obtain a boundary sensing feature $\sigma(t_0)$; and
   S6. accurately classifying, according to the boundary sensing feature $\sigma(t_0)$, activities inside and outside a sensing area by means of a sensing boundary formed by walls and extension lines thereof,
   wherein the new CSI obtained after the conjugate multiplication is:

$$H_{conj} = H_1(t_0+t) * H_2^*(t_0+t) \approx$$

$$A_{s1}A_{s2}e^{j(\varphi_{s1}-\varphi_{s2})} + A_{s1}\sum_d^D \alpha_d(t_0)e^{j(\varphi_{s1}-\varphi_d^2(t_0+t))} + A_{s2}\sum_d^D \alpha_d(t_0)e^{j(\varphi_d^1(t_0+t)-\varphi_{s2})}$$

in the formula, $H_{conj}$ represents the new CSI obtained after the conjugate multiplication, $H_1(t_0+t)$ represents CSI of a first antenna at the instant $t_0+t$, $H_2(t_0+t)$ represents CSI of a second antenna at the instant $t_0+t$, $H_2^*(t_0+t)$ represents a conjugate of $H_2(t_0+t)$, $A_{s1}$ represents amplitude of a combined static signal of the first antenna, $A_{s2}$ represents amplitude of a combined static signal of the second antenna, $\alpha_d(t_0)$ represents amplitude attenuation of a d-th dynamic signal at the instant $t_0$, $\varphi_{s1}$ represents phase offset of the combined static signal of the first antenna, $\varphi_{s2}$ represents phase offset of the combined static signal of the second antenna, $\varphi_d^1(t_0+t)$ represents phase offset of a dynamic signal of the first antenna at the instant $t_0+t$, and $\varphi_d^2(t_0+t)$ represents phase offset of a dynamic signal of the second antenna at the instant $t_0+t$.

2. The method for non-contact determination of the sensing boundary according to claim 1, wherein the conjugate set $S(t_0)$ is:

$$S(t_0)=[H_1(t_0)*H_2^*(t_0),H_1(t_0+\Delta t)*H_2^*(t_0+\Delta t), \ldots H_1(t_0+M\Delta t)*H_2^*(t_0+M\Delta t)]$$

wherein $[0, \Delta t, \ldots, M\Delta t]$ are CSI sampling intervals relative to the instant $t_0$, and $\Delta t$ is the sampling time.

3. The method for non-contact determination of the sensing boundary according to claim 1, wherein a k-th element $x(t_0+k\Delta t)$ in the zero-mean conjugate set $\overline{S(t_0)}$ is:

$$x(t_0+k\Delta t) = A_{s1}\sum_d^D \alpha_d(t_0)e^{j\Psi_d(t_0+k\Delta t)} + A_{s2}\sum_d^D \alpha_d(t_0)e^{j\Omega_d(t_0+k\Delta t)} =$$

$$R(t_0+k\Delta t) + i*I(t_0+k\Delta t)$$

wherein $\overline{S(t_0)}$ is the zero-mean conjugate set of $S(t_0)$, $\Psi_d(t_0+k\Delta t)=\varphi_{s1}-\varphi_d^2(t_0+k\Delta t)$, $\Omega_d(t_0+k\Delta t)=\varphi_d^1(t_0+k\Delta t)-\varphi_{s2}$, and $R(t_0+k\Delta t)$ and $I(t_0+k\Delta t)$ are respectively the real part and imaginary part of $x(t_0+k\Delta t)$, where $x(t_0+k\Delta t)$ is a complex number.

4. The method for non-contact determination of the sensing boundary according to claim 1, wherein the boundary sensing feature $\sigma(t_0)$ is obtained by performing probability distribution fitting on the absolute values $|x(t_0+k\Delta t)|$ of all the elements in the N zero-mean conjugate sets, and a mode of the probability distribution fitting is Rayleigh distribution, Rice distribution, or lognormal distribution.

5. The method for non-contact determination of the sensing boundary according to claim 1, wherein in said S6, the boundary sensing feature $\sigma(t_0)$ is compared with a preset boundary determination threshold $\delta_{th}$; when $\sigma(t_0)>\delta_{th}$, it is determined that a current activity is within the sensing area; and when $\sigma(t_0)<\delta_{th}$, it is determined that the current activity is outside the sensing area.

6. A non-transitory computer-readable medium having a set of instructions stored thereon, wherein the set of instructions, when executed on a processor, implement an indoor intrusion detection system based on the method for non-contact determination of the sensing boundary according to claim 1, the system comprising a receiving and measuring module, a conjugate multiplication module, a conjugate set construction module, a zero-mean conjugate set construction module, a boundary sensing feature calculation module, a moving and stationary detection module, and a feature-fusion intrusion determination module, wherein the conjugate multiplication module is configured to perform conjugate multiplication on Channel State Information (CSI) of two antennas at each instant, to obtain a new CSI signal stream; wherein data packets are received simultaneously by using the two antennas of a Wi-Fi receiving device of the receiving and measuring module and the CSI is measured;

the conjugate set construction module is configured to select a time window with the length M from the new CSI signal stream at the instant $t_0$, and collects M CSI samples in the time window, to form a conjugate set $S(t_0)$;

the zero-mean conjugate set construction module is configured to subtract the mean of $S(t_0)$ from all the samples in the conjugate set $S(t_0)$, to obtain a zero-mean conjugate set;

the boundary sensing feature calculation module is configured to obtain, by means of the conjugate multiplication module, the conjugate set construction module, and the zero-mean conjugate set construction module, N zero-mean conjugate sets for CSI on N sub-carriers simultaneously transmitted, and performs probability distribution fitting on the absolute values of all elements in the N zero-mean conjugate sets, to obtain a boundary sensing feature $\sigma(t_0)$;

the moving and stationary detection module is configured to extract a feature $Dmotion(t_0)$ for detecting a moving/stationary state of a target from the new CSI signal stream obtained after CSI conjugate multiplication/division transformation or an original CSI signal; and the feature-fusion intrusion determination module is configured to determine whether there is an intruder indoors by combining the boundary sensing feature $\sigma(t_0)$ and the moving and stationary detection feature $Dmotion(t_0)$.

7. The non-transitory computer-readable medium according to claim 6, wherein in the feature-fusion intrusion determination module, a method for determining whether there is an intruder indoors is as follows:

when $\sigma(t_0)-\sigma(t_{-1})>\beta_{th1}$, it indicates that an intruder intrudes into a room, wherein $\sigma(t_{-1})$ represents the magnitude of a boundary sensing feature at a previous instant of $t_0$, and $\rho_{th1}$ is a threshold for measuring the magnitude of a rise jump; when $\sigma(t_0)-\sigma(t_{-1})<\beta_{th2}$ and $Dmotion(t_0)>\mu_{th}$, wherein $\rho_{th2}$ is a threshold for measuring the magnitude of a fall jump and $\mu_{th}$ is a threshold for moving and stationary determination, it indicates that the intruder leaves the room; and when $\rho_{th2}<\sigma(t_0)-\sigma(t_{-1})<\rho_{th1}$, a moving/stationary state of the intruder is determined by combining the moving and stationary detection feature, that is, when $Dmotion(t_0)<\mu_{th}$, it indicates that the detected target is in a static state indoors, and when $Dmotion(t_0)>\mu_{th}$, it indicates that the intruder is in a moving state indoors.

8. A non-transitory computer-readable medium having a set of instructions stored thereon, wherein the set of instructions, when executed on a processor, implement an area detection system based on the method for non-contact determination of the sensing boundary according to claim 1, the system comprising a receiving and measuring module, a conjugate multiplication module, a conjugate set construction module, a zero-mean conjugate set construction module, a boundary sensing feature calculation module, an area code table building module, a global area code obtaining module, and an area detection module, wherein the conjugate multiplication module is configured to perform conjugate multiplication on Channel State Information (CSI) of two antennas at each instant, to obtain a new CSI signal stream; wherein data packets are received simultaneously by using the two antennas of a Wi-Fi receiving device of the receiving and measuring module and the CSI is measured;

the conjugate set construction module is configured to select a time window with the length M from the new CSI signal stream at the instant $t_0$, and collects M CSI samples in the time window, to form a conjugate set $S(t_0)$;

the zero-mean conjugate set construction module is configured to subtract the mean of $S(t_0)$ from all the samples in the conjugate set $S(t_0)$, to obtain a zero-mean conjugate set;

the boundary sensing feature calculation module is configured to obtain, by means of the conjugate multiplication module, the conjugate set construction module, and the zero-mean conjugate set construction module, N zero-mean conjugate sets for CSI on N sub-carriers simultaneously transmitted, and performs probability distribution fitting on the absolute values of all elements in the N zero-mean conjugate sets, to obtain a boundary sensing feature $\sigma(t_0)$;

the area code table building module is configured to build an area code table according to an area structure defined by walls and states of Wi-Fi receiving devices pre-deployed in different areas, as a reference for online area detection;

the global area code obtaining module is configured to compare the boundary sensing feature $\sigma_d(t_0)$ of each device with a threshold value $\delta_{th}$, to obtain a current global area code; and the area detection module is configured to query the built area code table for the current global area code, to identify a target area.

9. The non-transitory computer-readable medium according to claim 8, wherein in the area code table building module, a method for building the area code table is as follows: when a target moves in an area A, states of all Wi-Fi devices in the area A are set to 1, states of Wi-Fi devices in other areas are set to 0, and accordingly, 0/1 code situations of states of different devices in a case where the target moves in all areas are obtained, to form the area code table.

10. The area detection system according to claim 8, wherein in the global area code obtaining module, a method for obtaining a global area code is as follows:

when $\sigma_d(t_0)>\delta_{th}$, a current state of the device is set to 1, when $\sigma_d(t_0)<\delta_{th}$, the current state of the device is set to 0, and finally, states of different devices are combined to obtain the current global area code, wherein $\sigma_d(t_0)$ is a boundary sensing feature of a d-th device for distinguishing between activities inside and outside walls.

11. The non-transitory computer-readable medium according to claim 8, wherein in the area detection module, a method for identifying a target current area is as follows:

when the current global area code can be found in the area code table, the target current area is updated to a corresponding area in the area code table; and when the current global area code cannot be found in the area code table, the target is assumed to be in the same area of the previous instant.

12. A non-transitory computer-readable medium having a set of instructions stored thereon, wherein the set of instructions, when executed on a processor, implement a system for non-contact determination of a sensing boundary, the system comprising a receiving and measuring module, a conjugate multiplication module, a conjugate set module, a zero-mean conjugate set module, a boundary sensing feature calculation module, and a boundary determination module, wherein
the conjugate multiplication module is configured to perform conjugate multiplication on Channel State Information (CSI) of two antennas at each instant, to obtain a new CSI signal stream; wherein data packets are received simultaneously by using the two antennas of a Wi-Fi receiving device of the receiving and measuring module and the CSI is measured;
the conjugate set module is configured to select a time window with the length M from the new CSI signal stream at the instant $t_0$, and collects M CSI samples in the time window, to form a conjugate set $S(t_0)$;
the zero-mean conjugate set module is configured to subtract the mean of $S(t_0)$ from all the samples in the conjugate set $S(t_0)$, to obtain a zero-mean conjugate set;
the boundary sensing feature calculation module is configured to obtain, by means of the conjugate multiplication module, the conjugate set module, and the zero-mean conjugate set module, N zero-mean conjugate sets for CSI on N sub-carriers simultaneously transmitted, and performs probability distribution fitting on the absolute values of all elements in the N zero-mean conjugate sets, to obtain a boundary sensing feature $\sigma(t_0)$; and
the boundary determination module is configured to accurately classify, according to the boundary sensing feature $\sigma(t_0)$, activities inside and outside a sensing area by means of a sensing boundary formed by walls and extension lines thereof,
wherein the new CSI obtained after the conjugate multiplication is:

$$H_{conj} = H_1(t_0 + t) * H_2^*(t_0 + t) \approx$$
$$A_{s1}A_{s2}e^{j(\varphi_{s1}-\varphi_{s2})} + A_{s1}\sum_d^D \alpha_d(t_0)e^{j(\varphi_{s1}-\varphi_d^2(t_0+t))} + A_{s2}\sum_d^D \alpha_d(t_0)e^{j(\varphi_d^1(t_0+t)-\varphi_{s2})}$$

in the formula, $H_{conj}$ represents the new CSI obtained after the conjugate multiplication, $H_1(t_0+t)$ represents CSI of a first antenna at the instant $t_0+t$, $H_2(t_0+t)$ represents CSI of a second antenna at the instant $t_0+t$, $H_2^*(t_0+t)$ represents a conjugate of $H_2(t_0+t)$, $A_{s1}$ represents amplitude of a combined static signal of the first antenna, $A_{s2}$ represents amplitude of a combined static signal of the second antenna, $\alpha_d(t_0)$ represents amplitude attenuation of a d-th dynamic signal at the instant $t_0$, $\varphi_{s1}$ represents phase offset of the combined static signal of the first antenna, $\varphi_{s2}$ represents phase offset of the combined static signal of the second antenna, $\varphi_d^1(t_0+t)$ represents phase offset of a dynamic signal of the first antenna at the instant $t_0+t$, and $\varphi_d^2(t_0+t)$ represents phase offset of a dynamic signal of the second antenna at the instant $t_0+t$.

* * * * *